Oliver & Harrison,
Mounting Artificial Teeth.
No. 14,924.    Patented May 20, 1856.
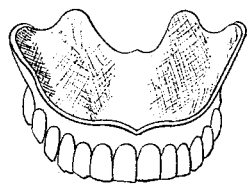
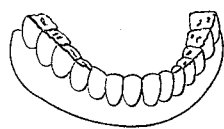
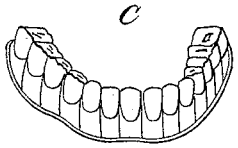
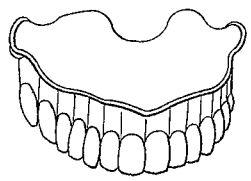
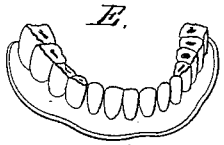
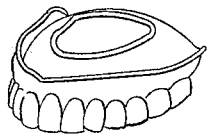
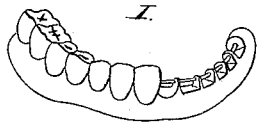
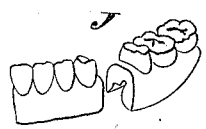
Witnesses:
Geo. Day
Edwin Hallowell
Inventors:
William G. Oliver
Thomas Harrison

UNITED STATES PATENT OFFICE.

WM. G. OLIVER AND THOMAS HARRISON, OF BUFFALO, NEW YORK.

DEVICE FOR SETTING ARTIFICIAL TEETH.

Specification of Letters Patent No. 14,924, dated May 20, 1856.

*To all whom it may concern:*

Be it known that we, WILLIAM G. OLIVER and THOMAS HARRISON, of Buffalo, in the county of Erie and State of New York, have invented certain new and useful Improvements in the Construction and Mode of Attaching the Teeth to Atmospheric and other Dental Plates, which we have described in the following specification and illustrated in the accompanying drawings with sufficient clearness to enable others of competent skill to make and use our invention.

Our invention consists in making the teeth with grooves and holes in their cheeks as hereinafter described, and attaching them to the plate by fusible metal cast into said grooves; and also in making the plate and attaching the teeth at one operation by casting as hereinafter more fully set forth.

In the accompanying drawings A is an upper set of teeth without gums, with cast metallic plate.

B is a lower set without gums, cast base; C, lower set with artificial gums, cast base; D, upper set with gums, cast metallic plate; E, lower set in blocks or sections, cast base, right side representing sections of four to the set, left side representing sections of two to the set; F, upper set without gums, cast atmospheric plate with air chamber; G, a quarter section inside view showing the holes that meet at right angles; H, same quarter section viewed from the base; I, lower set without gums, cast base, and with half the teeth broken off, showing the mode of attachment; J, two quarter sections of lower set ready for use by the dentist; K, a molar tooth, side view, showing the hole and groove; L, front view of same; M, side view of an incisor or front tooth for upper jaw; N, front of the same; O, side view of tooth, old style with platina pins; P, front of same; Q, side view of an incisor tooth, new improvement; R, front of same; S, side view of molar tooth.

In making an upper set with cast atmospheric plate, an impression of the jaw is first taken in the usual manner, and a plaster cast taken from the impression. A piece of sheet lead, a little thicker than the plate is designed to be when finished, is then shaped and fitted accurately to the plastic cast, after which it should be tried in the mouth, and adjusted perfectly. The lead plate should next be oiled on the under side, and laid on a flat surface upside down, and a frame of tin or zinc about two inches, deep should be laid around it; it should be large enough to leave a space between the plate and frame of at least half an inch; a mixture of plaster and fine sand equal parts should then be poured on the plate until about an inch deep in the frame, and when the composition has set sufficiently to bear handling, the frame must be taken off, and the form trimmed until the edges of the plate are perfectly free. If an air chamber is required, the plate is taken of the form, and enough wet plaster laid on to form the chamber, after which a groove is cut around so as to form a raised edge to the chamber when finished. The lead plate is next to be readjusted to the form, and the teeth fitted. The holes and grooves in the teeth should be filled with wax, and the teeth put into the proper position. The frame before mentioned should be placed around the form again and a mixture of plaster and sand poured over the teeth, first having taken the precaution to oil the plaster form that projects beyond the plate containing the teeth. When the composition has set, the frame may be removed and the mold separated and should be slowly dried. A passage or channel should then be cut to receive the metal, in a line with the back teeth on one side, and a smaller one on the opposite side as a vent; small vents should also be made all along the posterior edge. The mold should then be put together and heated up gradually in an oven. A metallic cup or ladle containing some pure grain tin should also be placed in the oven; and when the tin is melted so as to pour freely the cast should be made, and when cold the set of teeth and the plate may be easily detached, and the work is ready for finishing. The same directions will answer with slight and obvious variations for making lower sets also. In these operations of casting, the tin besides filling other parts of the mold, drives out the then melted wax and fills the grooves in the cheeks of the teeth and the holes through the teeth, which connects these grooves, and thus strengthen the attachment of the teeth to the plate.

The teeth may also be attached to any kind of metal plate, by first charging the grooves and holes with tin, and then soldering the tin to the plate.

We claim—

1. Making the teeth with grooves in their cheeks and attaching them to the plate by fusible metal cast into said grooves as set forth.

2. We also claim making the plate and attaching the teeth at one operation by casting as described.

WILLIAM G. OLIVER.
THOMAS HARRISON.

Witnesses:
AMELIAN CONKLING,
THOS. P. HOW.